United States Patent [19]

Ullrich

[11] Patent Number: 4,849,157

[45] Date of Patent: Jul. 18, 1989

[54] CORE BARREL FOR A HIGH-TEMPERATURE NUCLEAR REACTOR

[75] Inventor: Manfred Ullrich, Bergisch-Gladbach, Fed. Rep. of Germany

[73] Assignee: Interatom GmbH, Bergisch Gladbach, Fed. Rep. of Germany

[21] Appl. No.: 188,169

[22] Filed: Apr. 28, 1988

Related U.S. Application Data

[63] Continuation of Ser. No. 9,057, Jan. 27, 1987, abandoned, which is a continuation of Ser. No. 681,552, Dec. 14, 1984, abandoned.

[30] Foreign Application Priority Data

Dec. 15, 1983 [DE] Fed. Rep. of Germany ....... 3345478

[51] Int. Cl.$^4$ .......................... G21C 9/00; G21C 5/00
[52] U.S. Cl. .................................... 376/285; 376/304; 376/384; 376/459
[58] Field of Search .............. 376/459, 458, 381, 382, 376/302, 304, 285

[56] References Cited

U.S. PATENT DOCUMENTS

| | | | |
|---|---|---|---|
| 2,865,828 | 12/1958 | Long et al. ........................... | 376/304 |
| 3,124,514 | 3/1964 | Koutz et al. | |
| 3,157,582 | 11/1964 | Babule et al. ........................ | 376/459 |
| 3,206,374 | 9/1965 | Lemesle et al. ..................... | 376/304 |
| 4,476,089 | 10/1984 | Muller-Frank et al. ........ | 376/293 X |
| 4,492,291 | 1/1985 | Chometon et al. ............. | 376/285 X |

FOREIGN PATENT DOCUMENTS

| | | |
|---|---|---|
| 624286 | 2/1963 | Belgium . |
| 0059130 | 9/1982 | European Pat. Off. . |
| 2354540 | 5/1975 | Fed. Rep. of Germany . |
| 3016402 | 11/1981 | Fed. Rep. of Germany . |
| 3027421 | 2/1982 | Fed. Rep. of Germany . |
| 3047682 | 7/1982 | Fed. Rep. of Germany . |
| 985969 | 3/1965 | United Kingdom ................ 376/459 |
| 1129363 | 10/1968 | United Kingdom ................ 376/459 |

*Primary Examiner*—John S. Maples
*Attorney, Agent, or Firm*—Herbert L. Lerner; Laurence A. Greenberg

[57] ABSTRACT

Core barrel for a high-temperature nuclear reactor, including internal parts formed of an inner layer of graphite blocks stacked on each other and an outer layer of carbon blocks stacked on each other together forming columns, the blocks of the respective layers being staggered in height, offset relative to each other in azimuth and having indentations alternately formed therein causing each two layers of graphite blocks to be supported on a protruding layer of carbon blocks and each two layers of carbon blocks to be supported on a protruding layer of graphite blocks.

13 Claims, 2 Drawing Sheets

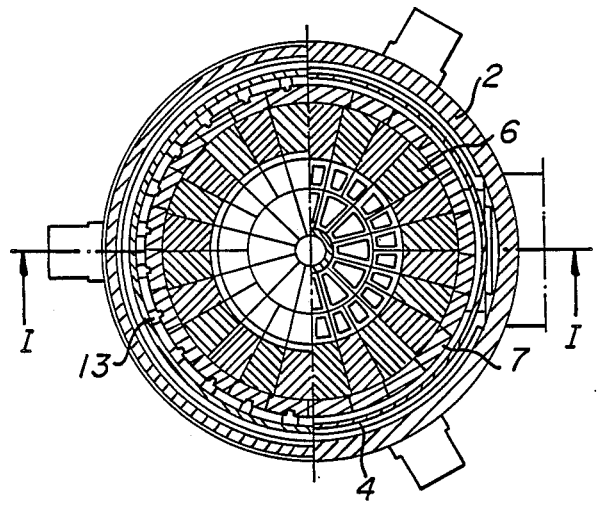
FIG.2
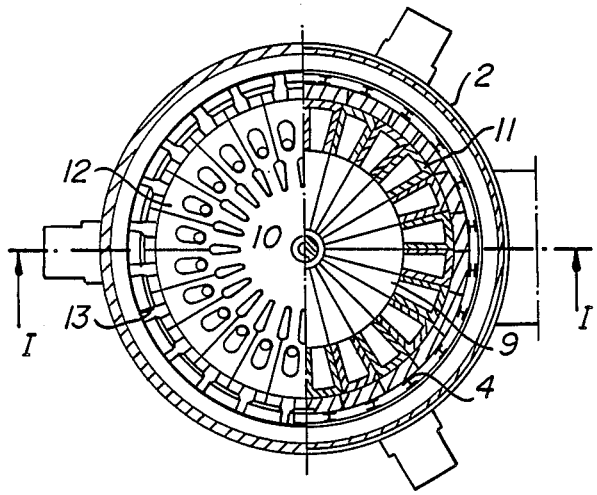
FIG. 3
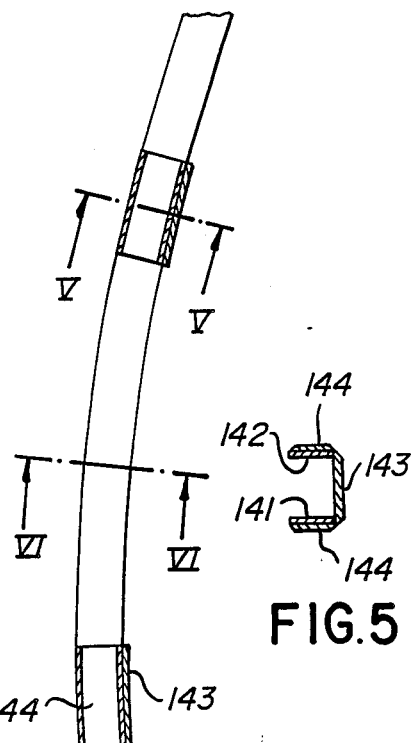
FIG.5
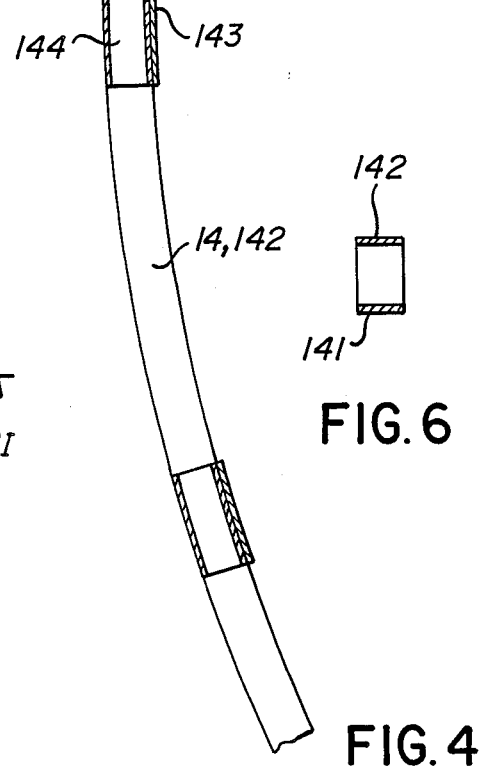
FIG. 6
FIG. 4

CORE BARREL FOR A HIGH-TEMPERATURE NUCLEAR REACTOR

This application is a continuation, of application Ser. No. 009,057, filed Jan. 27, 1987, now abandoned which is a continuation of application Ser. No. 681,552, filed Dec. 14, 1984, now abandoned.

The invention relates to a core barrel for a high-temperature nuclear reactor, having internal parts formed of graphite blocks and carbon blocks stacked on top of each other in columns.

A core barrel of this type has been described, for instance, in German Published, Non-Prosecuted Application DE-AS No. 30 16 402, corresponding to U.S. Pat. No. 4,476,089. In that device it has been proposed, among other things, to provide a metallic core barrel which can be removed from the plant as a whole as required, and is prepared with a lining of graphite or carbon blocks for receiving the spherical fuel elements. An inner layer of graphite causes neutrons to be reflected back into the fission zone. Since graphite is a relatively good heat conductor, an outer layer of carbon blocks is required for protecting the core barrel against the high temperature prevailing in the fission zone. These layers are assembled from stacked blocks as is masonry. The size of the individual blocks is limited by the manufacturing facilities available and the shape of the blocks is adapted to the desired purposes, such as protruding blocks for fabricating a cover forming the upper boundary of the space.

However, the structure described above does not sufficiently take into consideration the fact that graphite, carbon blocks and the steel used for fabricating the core barrel, exhibit rather different coefficients of thermal expansion. When starting up the reactor from room temperature to the operating temperature of about 950° C., and during the later shutdown and restarting processes, it is not assured in the prior art device that the weight of the internal parts will be sufficient to overcome the friction forces which occur at the boundary surfaces between the individual materials. Gaps can therefore form between the blocks in a completely uncontrolled manner and hot gas strands can travel into the core barrel through the gaps, which can endanger its strength.

It is accordingly an object of the invention to provide a core barrel for a high-temperature nuclear reactor, which overcomes the hereinafore-mentioned disadvantages of the heretofore-known devices of this general type, to construct the internal parts of the core barrel in a way which assures that after passing through the different operating states as many times as desired, no continuous gap formed between the individual blocks, and in which the stability of the "masonry" is preserved even if external forces (such as earthquakes) act on the core barrel; this applies even if the fuel elements forming the gap zone have been removed from the barrel and no longer contribute to the support thereof.

With the foregoing and other objects in view there is provided, in accordance with the invention, a core barrel for a high-temperature nuclear reactor, comprising internal parts formed of an inner layer of graphite blocks stacked on each other and an outer layer of carbon blocks stacked on each other together forming columns, said blocks of said respective layers being staggered in height, offset relative to each other in azimuth and having indentations or serrations alternately formed therein causing each two layers of graphite blocks to be supported on a protruding layer of carbon blocks and each two layers of carbon blocks to be supported on a protruding layer of graphite blocks. This assures that no gaps can form which are continuous in radial planes, and that the equalization of the different thermal expansions need no longer take place between the columns of graphite or carbon blocks as a whole, but only at partial heights.

In accordance with another feature of the invention, there is provided slot and key connections axially guiding the blocks, preferably the carbon blocks, of one of the layers relative to the core barrel. This prevents large-area friction between the outer layer of the internal parts and the core barrel and at the same time ensures that the azimuthal orientation of the blocks stacked up in a column cannot change relative to each other. Because of the small friction between the internal parts and the core barrel, the weight of the internal parts is always sufficient to prevent "sticking" of the blocks at the core barrel and to ensure that continuous gaps cannot be created in horizontal planes either.

In accordance with an additional feature of the invention there are provided circular rims or hoops radially holding the blocks of one of the layers, preferably the carbon blocks.

In accordance with an added feature of the invention there are provided circular rims radially holding the carbon blocks These rims ensure that the individual columns cannot shift relative to each other in the radial direction, and they improve the stability.

In accordance with yet another feature of the invention the circular rims are each formed of two parallel rings disposed in a cross-sectional plane passing through the core barrel, and straps each interconnecting said rings over a portion of the periphery thereof at a respective one of the columns. The "soft" construction of the rims in the boundary region between the individual columns permits a thermal expansion of adjacent columns, the height of which differs.

In accordance with yet a further feature of the invention there are provided reinforcements disposed on the rings at the straps. This enhances the effect of the rings and straps.

In accordance with yet an additional feature of the invention, the columns include upper most blocks having projections formed thereon forming a ceiling, and including metal blocks each weighting a respective column, and a common cover plate connected to the metal blocks. This prevents toppling of the individual columns of the internal parts with the projections which are formed at the uppermost blocks and form the ceiling. It also permits the vault-like construction to be dispensed with because of the possible different thermal expansion of the individual columns. The metal block simultaneously increases the weight which already acts on the uppermost blocks of each column, in such a manner that the friction forces between the individual materials are overcome.

In accordance with a concomitant feature of the invention, the cover plate has slots formed therein, each extending partially through the cover plate in radial direction at a respective one of the columns. This also permits thermal expansion of the individual columns which are different in height.

Other features which are considered as characteristic for the invention are set forth in the appended claims.

Although the invention is illustrated and described herein as embodied in core barrel for a high-temperature nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 2 is a cross-sectional view taken along the line II—II in FIG. 1 in the direction of the arrow;

FIG. 3 is a cross-sectional view taken along the line III—III in FIG. 1 in the direction of the arrows;

FIG. 4 is a fragmentary, enlarged, top-plan view of part of a hoop or rim ;

FIG. 5 is a cross-sectional view taken along the line V—V in FIG. 4 in the direction of the arrows; and FIG. 6 is a cross-sectional view taken along the line VI—VI in FIG. 4, in the direction of the arrows.

Figure 1:
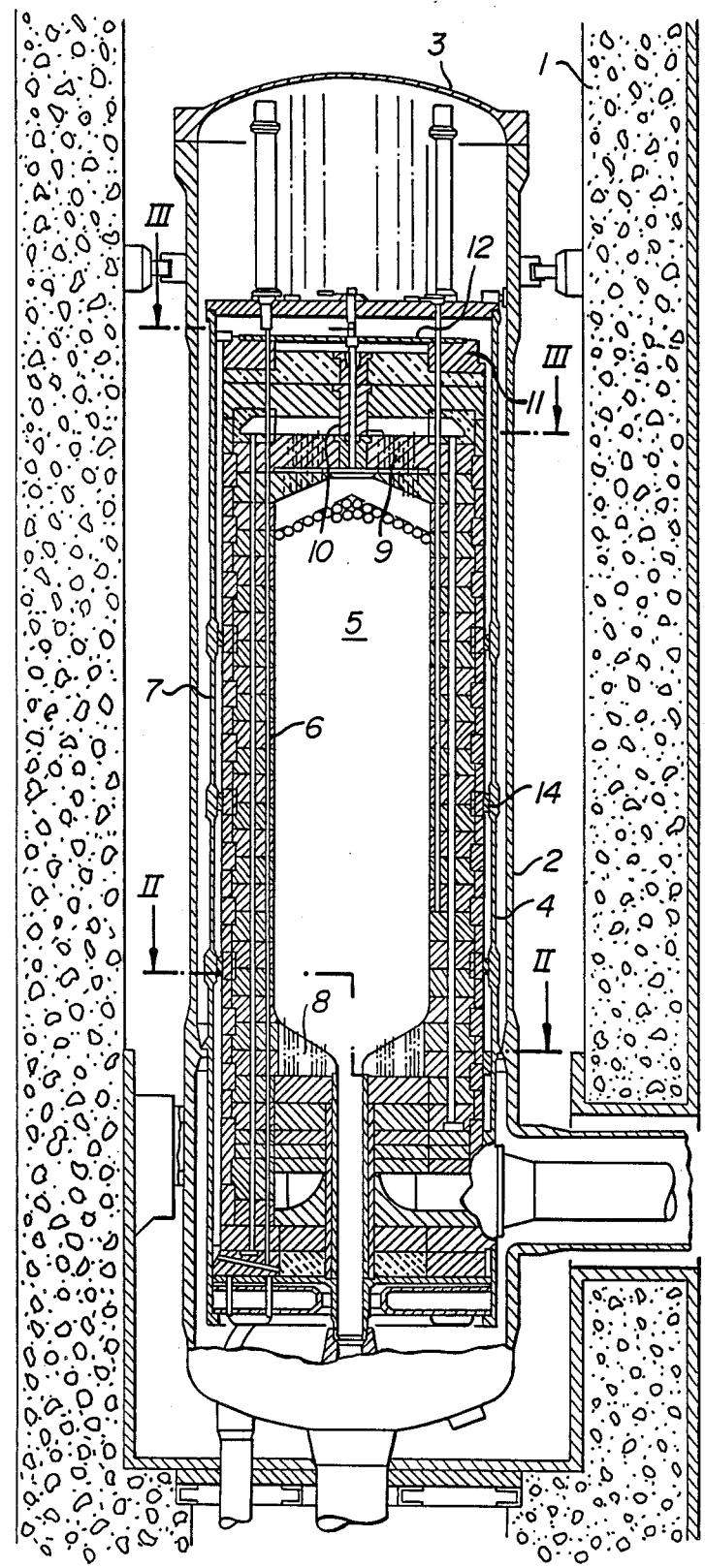
FIG. 1 is a fragmentary, diagrammatic, axial, longitudinal-sectional view of a gas-cooled high-temperature reactor taken along the line I—I in FIGS. 2 and 3 in the direction of the arrows.

Referring now to the figures of the drawings as a whole in detail, there is seen a steel pressure vessel 2 disposed within a concrete structure 1 serving as a radiation shield. The steel pressure vessel 2 is provided at its upper end with a detachable cover 3. A core barrel 4 which is also metallic, is disposed within the pressure vessel 2. The core barrel contains internal ceramic parts which surround a space for accommodating a fission zone 5 which is formed of a multiplicity of spherical fuel elements. The internal parts are formed of an inner layer of graphite blocks 6 and an outer layer of carbon blocks 7 which are stacked as shown in the embodiment to form 24 mutually adjacent columns.

It can be seen from FIG. 2, that the columns of graphite blocks 6 and the columns of carbon blocks 7 are offset relative to each other in azimuth. The gaps which unavoidably exist between the individual columns in the cold state, are not continuous according to the invention, and upon starting the reactor when the gaps only gradually close, strands of the gases heated up in the fission zone 5 cannot enter into the core barrel 4. A structure which can be seen from FIG. 1 is to be mutually serrated, indented or geared and staggered as to height, is provided for suppressing horizontal gaps between blocks. In this structure, graphite blocks 6 project into indentations in the column of carbon blocks and conversely, carbon blocks 7 project into indentation in the column of graphite blocks 6. A bottom 8 which forms the lower boundary of the internal parts, corresponds to the conventional construction and has no peculiarities.

A ceiling 9 which forms the upper boundary is formed by projections which are formed at the respective uppermost graphite blocks 6 in each column. These also are joined together without being directly connected to each other, and envelop a removable plug 10 in the center. In order to compensate the tilting moment, each column of the graphite blocks 6 is weighted down by a special metal block 11, which may be formed of cast iron, that additionally contributes to overcoming the friction forces occurring between the graphite blocks 6 and the carbon blocks 7. The metal block is bolted at its surface to a cover plate 12, as seen at the left half of FIG. 3, which is radially slotted in its outer portion, corresponding to the pitch of the columns. Thus, individual lobes are generated, which can follow the different thermal expansions of the corresponding column, independently of the adjacent columns.

The core barrel 4 is provided on the inside thereof with a guide track 13 for each column of the outer layer. The guide track 13 operates like a key and engages slots formed in the carbon blocks 7 for this purpose. The azimuthal orientation of the individual blocks standing on top of each other in a column is therefore the same. The blocks 7 can simultaneously slide on the guide tracks 13 with respect to height, by the amount required due to the different thermal expansions. Radial coherence provided is provided for by several hoops or rims 14 which are distributed over the height and are fastened to each column of the outer layer. In order to nevertheless permit unimpeded thermal expansion in height, the hoops or rims 14 are only "stiff" over part of the periphery thereof. Each hoop or rim is formed of two rings 141, 142 which are disposed parallel to each other and are only connected to each other over part of the periphery thereof by one strap 143 per column. If required, the rings 141, 142 can be further stiffened by double layer reinforcements 144 applied in the same regions.

As is readily apparent from FIGS. 4 to 6, the hoops or rims are wider in axial direction of the core barrel than in radial direction of the core barrel, not width of strap 143 compared to width of ring 141 or 142 in FIG. 5.

The foregoing is a description corresponding, in substance, to German application patent No. 33 45 478.7, dated Dec. 15, 1983, International priority of which is being claimed for the instant application, and which is hereby made part of this application. Any material discrepancies between the foregoing specification and the specification of the aforementioned corresponding German application are to be resolved in favor of the latter.

I claim:

1. Core barrel for a high-temperature nuclear reactor acid barrel including a longitudinal axis, comprising internal parts formed of an inner layer of graphite blocks stacked one above the other and an outer layer of carbon blocks stacked one above the other and together forming columns, said blocks of said respective layers being staggered in height, the carbon blocks of each of said columns thereof having a respective side facing towards the inside of said core barrel, said side, respectively, of the carbon blocks of each of said columns thereof being alternately located closer to and away from the longitudinal axis of said core barrel so that said columns of carbon blocks are formed width vertically alternating indentations and protuberance facing towards the longitudinal axis of said core barrel, and the graphite blocks of each of said columns thereof having a respective side facing away from the inside of said core barrel, each of said sides, respectively, of the graphite blocks of each of said columns thereof having respective parts thereof located away from and closer to the longitudinal axis of said core barrel, so that said columns of graphite blocks are formed with vertically alternating indentations and protuberances facing away from the longitudinal axis of said core barrel, said protuberances of said columns of carbon blocks projecting into said indentations of said columns of graphite blocks, and said protuberances of said columns of graphite blocks projecting into said indentations of said columns of carbon blocks.

2. Core barrel according to claim 1, including slot and key connections for guiding said blocks of one of said layers in axial direction of the core barrel.

3. Core barrel according to claim 2, including circular rims radially holding said blocks of one of said layers.

4. Core barrel according to claim 1, including slot and key connections axially guiding said carbon blocks.

5. Core barrel according to claim 4, including circular rims radially holding said carbon blocks.

6. Core barrel according to claim 1, including circular rims radially holding said blocks of one of said layers said circular rims being wider in radial than in axial direction of the core barrel.

7. Core barrel according to claim 6, wherein said circular rims are each formed of two parallel rings disposed in a cross-sectional plane passing through the core barrel, and straps each interconnecting said rings over a portion of the periphery thereof at a respective one of said columns.

8. Core barrel according to claim 7, including reinforcements disposed on said rings at said straps.

9. Core barrel according to claim 1, including circular rims radially holding said carbon blocks.

10. Core barrel according to claim 9, wherein said circular rims are each formed of two parallel rings disposed in a cross-sectional plane passing through the core barrel, and straps each interconnecting said rings over a portion of the periphery thereof at a respective one of said columns.

11. Core barrel according to claim 10, including reinforcements disposed on said rings at said straps.

12. Core barrel according to claim 1, wherein said columns include uppermost blocks having projections formed thereon forming a ceiling, and including metal blocks each weighting a respective column, and a common cover plate connected to said metal blocks.

13. Core barrel according to claim 12, wherein said cover plate has slots formed therein, each of said slots extending partially through said cover plate in radial direction at a respective one of said columns.

* * * * *